(No Model.)

H. C. BERRY.
HEATING APPARATUS.

No. 345,876. Patented July 20, 1886.

WITNESSES:

INVENTOR:
H. C. Berry
BY Munn & Co.
ATTORNEYS.

UNITED STATES PATENT OFFICE.

HENRY C. BERRY, OF WAUSEON, OHIO.

HEATING APPARATUS.

SPECIFICATION forming part of Letters Patent No. 345,876, dated July 20, 1886.

Application filed April 29, 1885. Serial No. 163,863. (No model.)

*To all whom it may concern:*

Be it known that I, HENRY C. BERRY, of Wauseon, in the county of Fulton and State of Ohio, have invented a new and Improved Heating Apparatus, of which the following is a full, clear, and exact description.

My invention, as embraced in this application, consists in the construction and arrangement of the fire-pot hereinafter fully described, and specifically pointed out in the claims.

Reference is to be had to the accompanying drawings, forming part of this specification, in which similar letters of reference indicate corresponding parts in all the figures.

Figure 1:
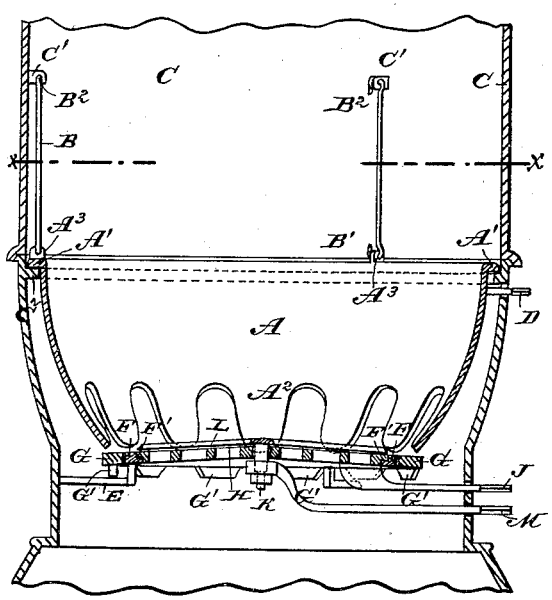
Figure 3:
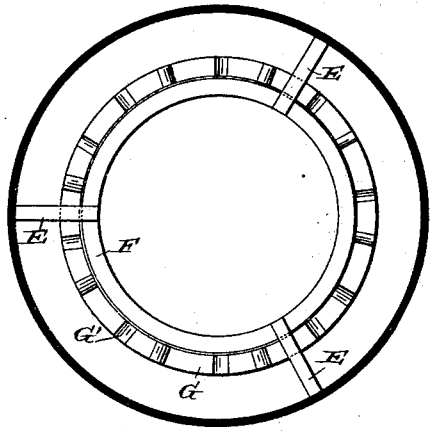
Figure 4:
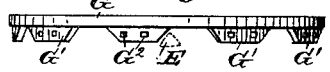
Figure 2:
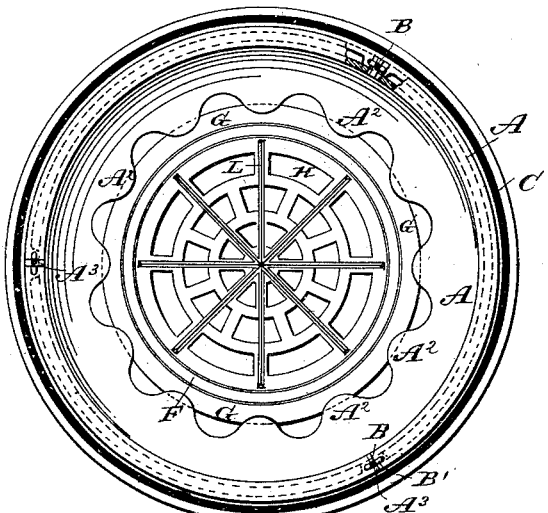
Figure 5:

Figure 1 is a cross-sectional elevation of my improved heating apparatus. Fig. 2 is a sectional plan view of the same on the line $x\,x$, Fig. 1. Fig. 3 is a sectional plan view of the under side of the grate-support. Figs. 4 and 5 are detail views of parts of the apparatus.

The fire-pot A has the exterior flange, A', at its top and the tongues $A^2$ at the bottom. On the top of the flange A' three or more apertured lugs, $A^3$, are formed, through which hooks B' on the lower ends of rods B are passed, the hooks $B^2$ on the upper ends of the said rods being passed through apertured lugs C' on the inner side of the outer casing, C, which casing has an inwardly-projecting flange, $C^2$, on which the flange A' of the fire-pot can rest. The flange $C^2$ acts as a safeguard in case the rods B or one of them should break or burn out, as said flange would then support the fire-pot in operative position until a new rod or rods could be supplied. A pin, D, projects from the fire-pot or vessel A through a slot in the casing C. Below the fire-pot arms E project from the inner surface of the casing C toward the middle, and support a ring, F, having a rabbet, F', or lugs formed on its inner edge, which ring F is surrounded by a ring, G, having a series of lugs, G', on its under side, the ends of the lugs being beveled, and the lugs having apertures $G^2$. The ring G rests upon the arms E, the tops of which are beveled down to both sides, as shown in dotted lines in Fig. 4. Within the ring F a circular grate, H, fits, which is convex-inclined from the middle toward the edge, and has its edge rabbeted to fit the rabbet F' on the ring F. A handle, J, secured to the under side of the circular grate projects through a slot in the casing C. A bolt, K, is passed through the middle of the grate H, and on its top a spider or star grate frame, L, is held, which rests upon and is adapted to turn on the grate H. A handle, M, is secured or held on the lower end of the bolt, and projects through a slot in the casing C.

The apertures $G^2$ in the lugs G' of the ring G serve to receive the end of a key or rod for turning the said ring.

The operation is as follows: A key is applied on the pin D, and the basket or vessel A is turned, and as it is suspended it is raised and lowered alternately, and the distance between the tongues $A^2$ and the ring G is alternately increased and decreased, and has rotary motion, whereby the ashes and other accumulations are removed or caused to drop through the grate H and through the space between the tongues $A^2$ and the ring G. By means of a rod or key passed into apertures $G^2$ the ring G can be worked to and fro, and as the beveled lugs G' work over the beveled arms the said ring is vibrated, and the clinkers, cinders, ashes, &c., resting on the rings F and G are loosened or moved. By means of the handle J the grate H can be turned in the ring F, and the ashes, &c., caused to work through the slots, &c., in the grate H. As the said grate is convex-inclined, the ashes, &c., work down the same to the edges. By means of the handle M the spider-grate L can be turned over the surface of the grate H, whereby ashes, cinders, &c., are worked through the slots in the grate or out over its edges, and clinkers, &c., on the said parts are broken or removed, or both.

The parts described can be used separately or in combination, and can be constructed, in whole or in part, of cast-iron or other suitable metal.

I am aware that a fire-pot has been provided with a series of depending swinging bars around its lower edge, a grate being connected with the lower ends of the bars; also, that the inner side of the shell or casing of a stove has been provided with a series of flanges, on which the flanges of a series of circular fire-pot sections have been supported, and I do not claim such, broadly, as of my invention.

I do not claim in this application the particular construction of my grate with its surrounding ring resting on the grate-supporting arms, nor the pivoted spider, as I reserve the right to claim the same in a separate application.

I am also aware that a deflector mouth-piece has been rigidly suspended by hooked rods a few inches below the lower end of the magazine, to direct the fuel into the fire-pot and deflect the gases from the magazine, and I do not claim the same as of my invention.

Having thus described my invention, what I claim as new, and desire to secure by Letters Patent, is—

1. The combination, with the casing having a grate, of a fire-pot above the grate and rods loosely connected to the upper end of the fire-pot and to the inner side of the casing, substantially as set forth.

2. The combination, with the casing having an interior flange, of the cylindrical fire-pot, open at both ends and provided at its upper end with a flange resting on the flange of the casing, and rods loosely connected to the casing above the fire-pot and to the upper edge of the fire-pot, substantially as set forth, whereby should the rods break the flanges will support the fire-pot, as described.

3. The combination, with the casing C, having the flange $C^2$, the eyes $C'$ above the flange, and a grate, of the rotary and vertically-movable fire-pot A, having a flange, $A'$, around its upper edge, and eyes $A^3$ on its upper edge, and the rods B, having hooks at their opposite ends engaging the eyes $C'$ and $A^3$, respectively, substantially as set forth.

HENRY C. BERRY.

Witnesses:
J. C. KING,
M. SLUSSER.